United States Patent [19]

Takagi et al.

[11] Patent Number: 5,073,093
[45] Date of Patent: Dec. 17, 1991

[54] SCROLL-TYPE FLUID HANDLING MACHINE

[75] Inventors: Nobukazu Takagi, Saitama; Takeshi Seto, Nagano, both of Japan

[73] Assignees: Diesel KiKi Co., Ltd.; Seiko Epson Corporation, both of Tokyo, Japan

[21] Appl. No.: 529,128

[22] Filed: May 25, 1990

[30] Foreign Application Priority Data

May 26, 1989 [JP] Japan .................................. 1-133822

[51] Int. Cl.⁵ .............................................. F04D 5/00
[52] U.S. Cl. ...................................... 417/410; 417/902
[58] Field of Search ................................ 417/410, 902

[56] References Cited

U.S. PATENT DOCUMENTS 4,950,135  8/1990  Tojo et al. ........................ 417/410

*Primary Examiner*—Gerald A. Michalsky
*Attorney, Agent, or Firm*—Kanesaka & Takeuchi

[57] ABSTRACT

Here is disclosed a scroll-type fluid handling machine having a hermetically sealed casing enclosing therein a stationary side scroll member fixed to the casing, a movable side scroll member adapted to be rotatable in engagement with the stationary side scroll member and an electromotor used to drive the movable side scroll member, wherein said electromotor comprises a linear motor consisting of movable side magnets and stationary side coils mutually facing in the axial direction of the machine itself and is adapted to directly drive the movable side scroll member. Such feature makes the drive shaft as well as the crankshaft which have conventionally been essential to the machine unnecessary, thereby minimizing a mechanical loss and improving a mechanical efficiency. In addition, the axial dimension of the machine can be substantially reduced so as to obtain a compact, light weight machine.

1 Claim, 10 Drawing Sheets

SCROLL-TYPE FLUID HANDLING MACHINE

BACKGROUND OF THE INVENTION

1. Field of the Invention

The present invention relates to a scroll-type fluid handling machine used for air conditioner, refrigerator or the like.

2. Prior Art

The scroll type fluid handling machine of prior art generally has a hermetically sealed casing enclosing therein an electromotor consisting of a rotor integrally mounted on a drive shaft and a stater provided around this rotor, a crankshaft eccentrically connected to the drive shaft of said electromotor, a stationary side scroll member fixed to the casing, and a movable side scroll member positioned to be engaged with the stationary side scroll member and connected to said crankshaft.

Eccentric movement of the crankshaft occurs as the drive shaft of the electromotor rotates and causes the movable side scroll member to be rotated in engagement with the stationary side scroll member so that a stream of coolant is compressed successively in a suction pressure chamber, an intermediate pressure chamber and a discharge pressure chamber defined between the both scroll members.

With such scroll-type fluid handling machine of well known art, however, a rotational output of the electromotor is transmitted by the crankshaft to the movable side scroll member to rotate the latter, so not only its construction is necessarily complicated but also excessive bending moment and other factors exerted on the crankshaft cause a mechanical loss, thus limiting improvement of overall mechanical efficiency.

Furthermore, the conventional construction that the electromotor comprises the rotor and the stator mounted around the rotor, on one hand, and the movable side scroll member is rotationally driven from the drive shaft via the crankshaft, on the other hand, inevitably increases the axial dimension of the machine and results in a bulky machine.

Accordingly, it is a primary object of the invention to provide an improved scroll-type fluid handling machine allowing both the drive shaft of the electromotor and the crankshaft required by the prior art to be eliminated so as to reduce a mechanical loss, thereby to improve a mechanical efficiency, and allowing the axial dimension of the machine itself to be sufficiently reduced to achieve a compact and light weight machine of fewer parts and thereby to reduce a manufacturing cost.

SUMMARY OF THE INVENTION

The object set forth above is achieved, in accordance with the present invention, by a scroll-type fluid handling machine having a hermetically sealed casing enclosing therein a stationary side scroll member fixed to the casing, a movable side scroll member adapted to be rotatable in engagement with the stationary side scroll member, and an electromotor to drive the movable side scroll member, wherein said electromotor comprises a linear motor consisting of movable side magnets and stationary side coils; wherein said movable side magnets face the associated stationary side coils in the axial direction of the machine itself; and wherein said movable side magnets are mounted on said movable side scroll member and said stationary side coils are fixed to the casing.

These and the other features, objects and advantages of the invention will be apparent from the following description of preferred embodiments made in reference with the accompanying drawings.

BRIEF DESCRIPTION OF THE DRAWINGS

FIGS. 1 through 6 illustrate an embodiment of the invention, in which;

FIG. 1 is a vertical sectional view of the scroll-type fluid handling machine;

FIG. 2 is a sectional view taken along a line II—II in FIG. 1, showing an arrangement of coils;

FIG. 3 is a sectional view taken along a line III—III in FIG. 1, showing an arrangement of magnets;

FIG. 4 is a sectional view taken along a line IV—IV in FIG. 6, showing an electromotor;

FIG. 5 is a perspective view of the magnets; and

FIG. 6 is a sectional view as viewed along a line VI—VI in FIG. 4, showing the coil;

FIGS. 7 through 10 illustrate another embodiment of the invention, in which;

FIG. 7 is a vertical sectional view of the scroll-type fluid handling machine;

FIG. 8 is a sectional view taken along a line VIII—VIII in FIG. 7;

FIG. 9 is a sectional view taken along a line IX—IX in FIG. 7; and

FIG. 10 is a sectional view taken along a line X—X in FIG. 7, showing a mechanism for prevention of uncontrolled rotation.

DETAILED DESCRIPTION OF PREFERRED EMBODIMENTS

Figure 1:
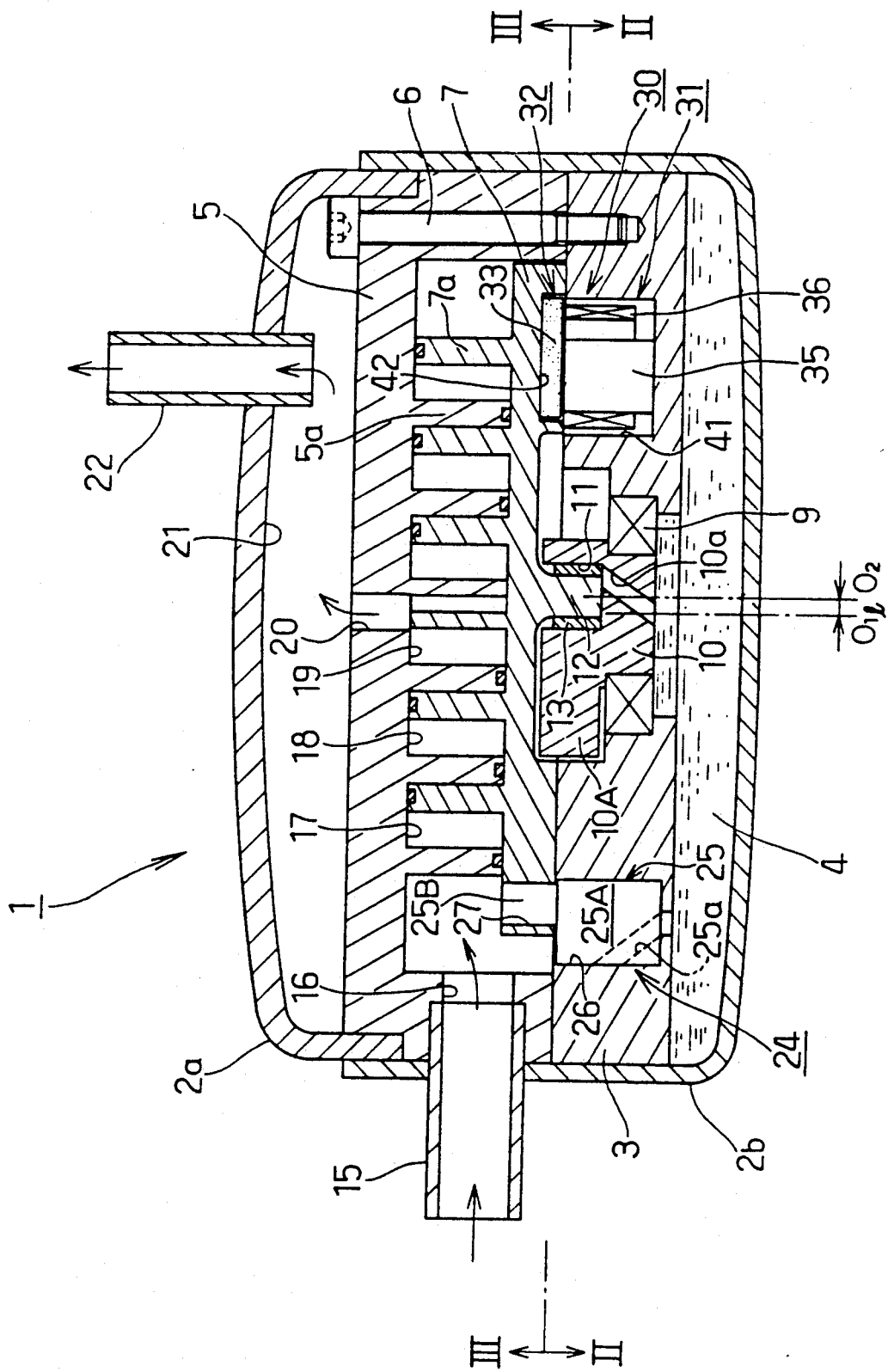

Referring to FIG. 1, reference numeral 1 designates a scroll-type fluid handling machine, reference numeral 2a designates an upper casing, and reference numeral 2b designates a lower casing, these casings 2a, 2b are joined to each other as by means of welding so as to provide a hermetically sealed space therebetween.

A disc-like stationary member 3 is secured to the inside of the lower casing 2b as by means of welding and an oil reservoir 4 extends over a bottom of the lower casing 2b. A stationary side scroll member 5 configurated to be suited to the upper and lower casings 2a, 2b is secured by means of bolts 6 to the top of the stationary member 3 at a plurality of locations circumferentially spaced from one another adjacent the outer edge thereof. Between the stationary member 3 and the stationary side scroll member 5 there is provided a movable side scroll member 7 with a movable side scroll 7a being engaged with a stationary side scroll 5a.

The stationary member 3 holds at its center a stationary shaft 10 by means of a bearing 9. The shaft 10 is formed with a pit 11 being eccentric with respect to the center $O_1$ of said stationary shaft 10 by a distance l so as to rotatably support a rotatable shaft 12 projecting from the rear side (i.e., lower surface as viewed in FIG. 1) of the movable side scroll member 7 and being correspondingly eccentric by the same distance l by means of a metallic bearing 13 so that the movable side scroll member 7 may be rotatably driven with its scroll 7a being engaged with the stationary side scroll 5a. The lower casing 2 b is provided with a suction pipe 15 extending through the side wall thereof and a stream of coolant is introduced from this suction pipe 15 through a suction port 16 formed in the stationary side scroll member 5 into the machine 1. The stream of coolant is successivley compressed in a suction pressure chamber 17, an intermediate pressure chamber 18 and a discharge pressure chamber 19 all being formed between the both scrolls 5a, 7a, and then flows through a discharge port 20 formed in the stationary side out from a discharge pipe 22 extending through the upper casing 2a. Reference numeral 10A designates a balancing weight provided integrally with the stationary shaft 10 to compensate a rotary imbalance possible occurring as the movable side scroll member 7 is rotated. Reference numerals 10a, 25a designate oiling passageways, respectively.

This scroll-type fluid handling machine 1 further includes a mechanism 24 to prevent uncontrolled rotation of the movable side scroll member 7. In this specific embodiment, the mechanism 24 comprises three pins 25 which are, as seen in FIGS. 2 and 3, positioned at regular intervals so that a diameter-enlarged portion 25A of each pin 25 may be rotatably inserted into a correspondingly diameter-enlarged opening 26 formed in the stationary member 3 while a diameter-reduced portion 25b of each pin 25 may be rotatably inserted into a correspondingly diameter-reducing opening 27 formed in the movable side scroll member 7 to prevent the movable side scroll member 7 from uncontrollably rotating.

The scroll-type fluid handling machine 1 further includes an electromotor 30 serving to rotationally drive the movable side scroll member 7. This electromotor 30 comprises six sets of linear motors each consisting of a coil 31 on the primary, i.e., stationary side and a magnet 32 on the secondary, i.e., movable side. The coil 31 and the magnet 32 of each set have substantially the same rectangular shape with a predetermined width as viewed in FIGS. 2 and 3, and the coil 31 is provided on the upper side of the stationary member 3 while the magnet 32 is provided on the lower side of the movable scroll member 7 so that the coil 31 and the magnet 32 of each set are opposed to each other in the axial direction of the machine itself.

Figure 4:
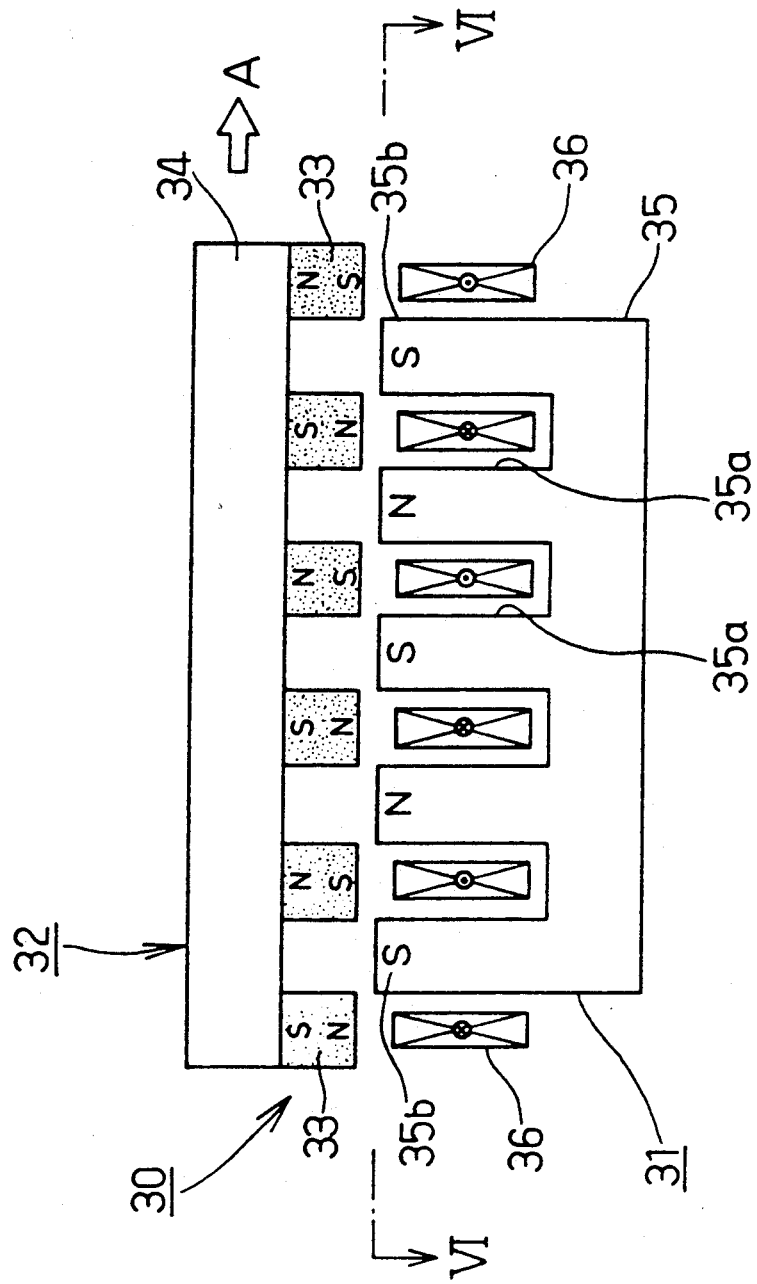
Figure 5:
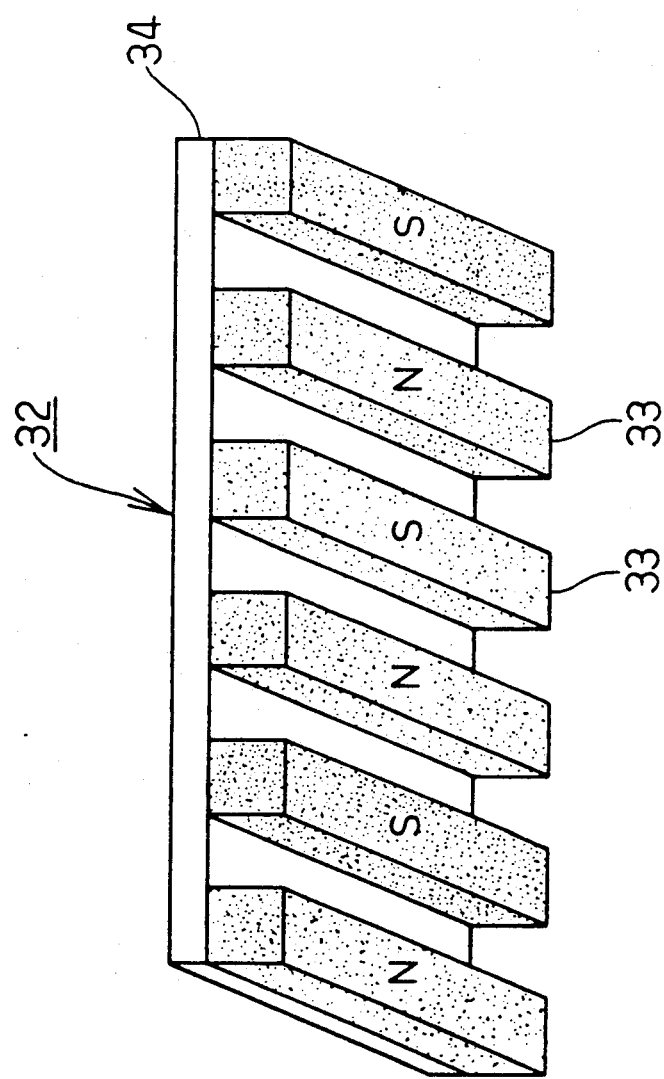
Figure 6:
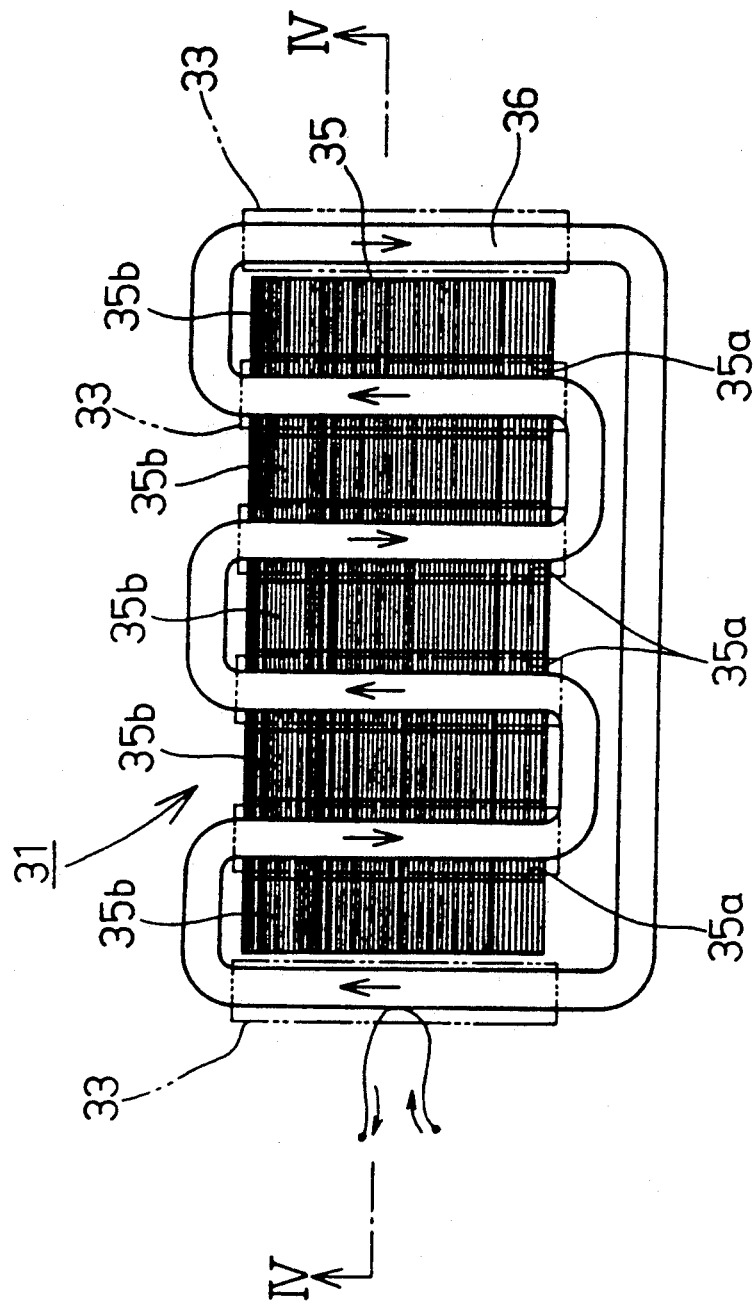

Referring to FIGS. 4 and 5, said magnet 32 comprises a plurality of square pillar-shaped magnet components 33 parallelly spaced from one another by predetermined distances and carried by a support plate 34. These magnet components 33 are so magnetized that their polarities (N and S) alternate along the side facing the coil 31. Said coil 31 is formed on the side facing the magnet 32 comprising laminated steel plates 35 alternately with slots 35a and projecting poles 35b in association with the arrangement of said magnet components 33 and a zigzag winding 36 is inserted into the slots 35a, as seen in FIGS. 4 and 6. Energization, for example, in a direction indicated by an arrow in FIG. 6 magnetizes said projecting poles 35b alternately as N and S poles. In consequence, the projecting pole 35b and the adjacent magnet component 33 of said magnet 32 having the same polarity repel each other while the projecting pole 35b and the adjacent magnet component 33 having the different polarities attract each other, linearly thrusting the magnet 32 in a direction indicated by an arrow A in FIG. 4.

Figure 2:
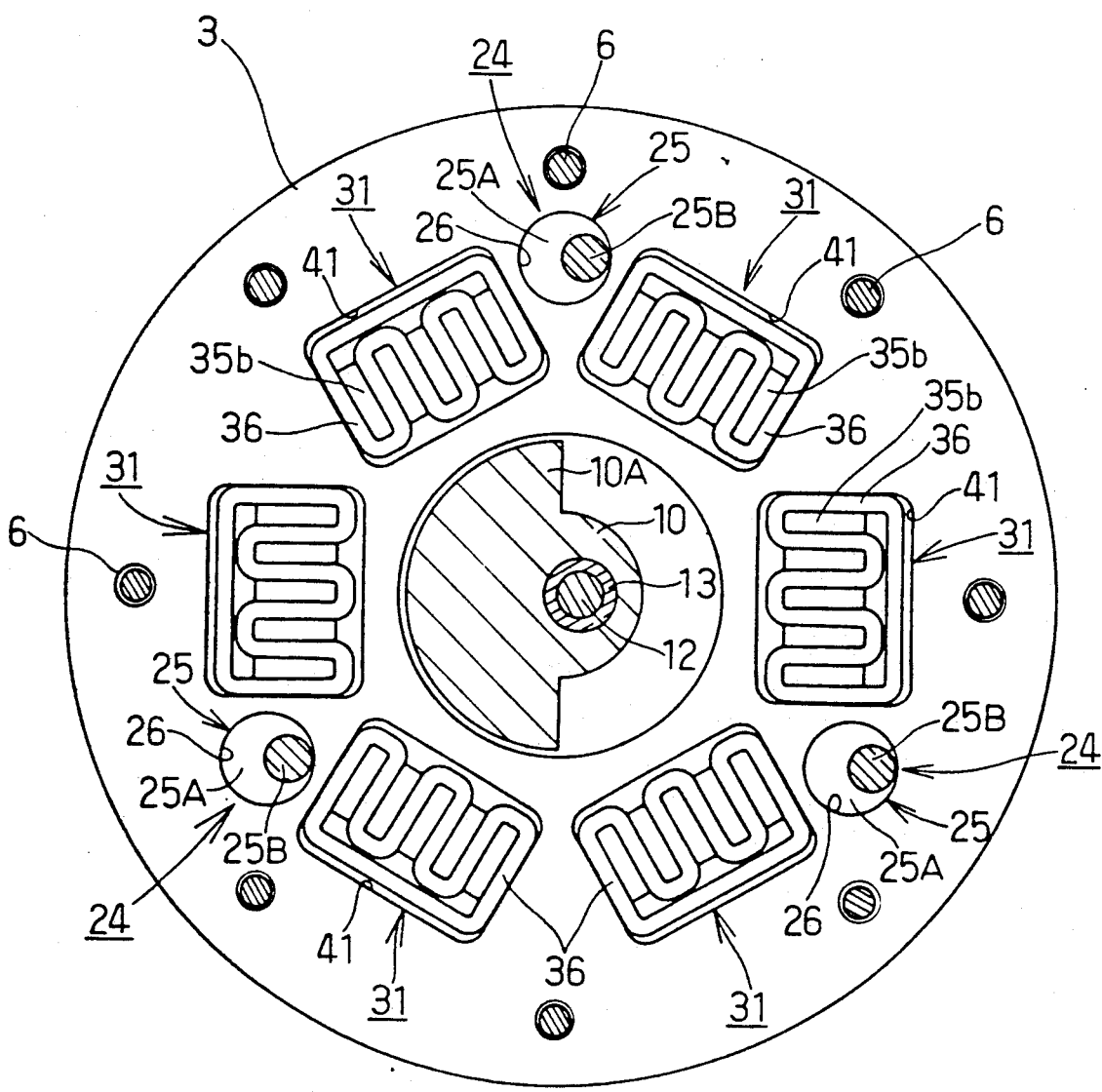
Figure 3:
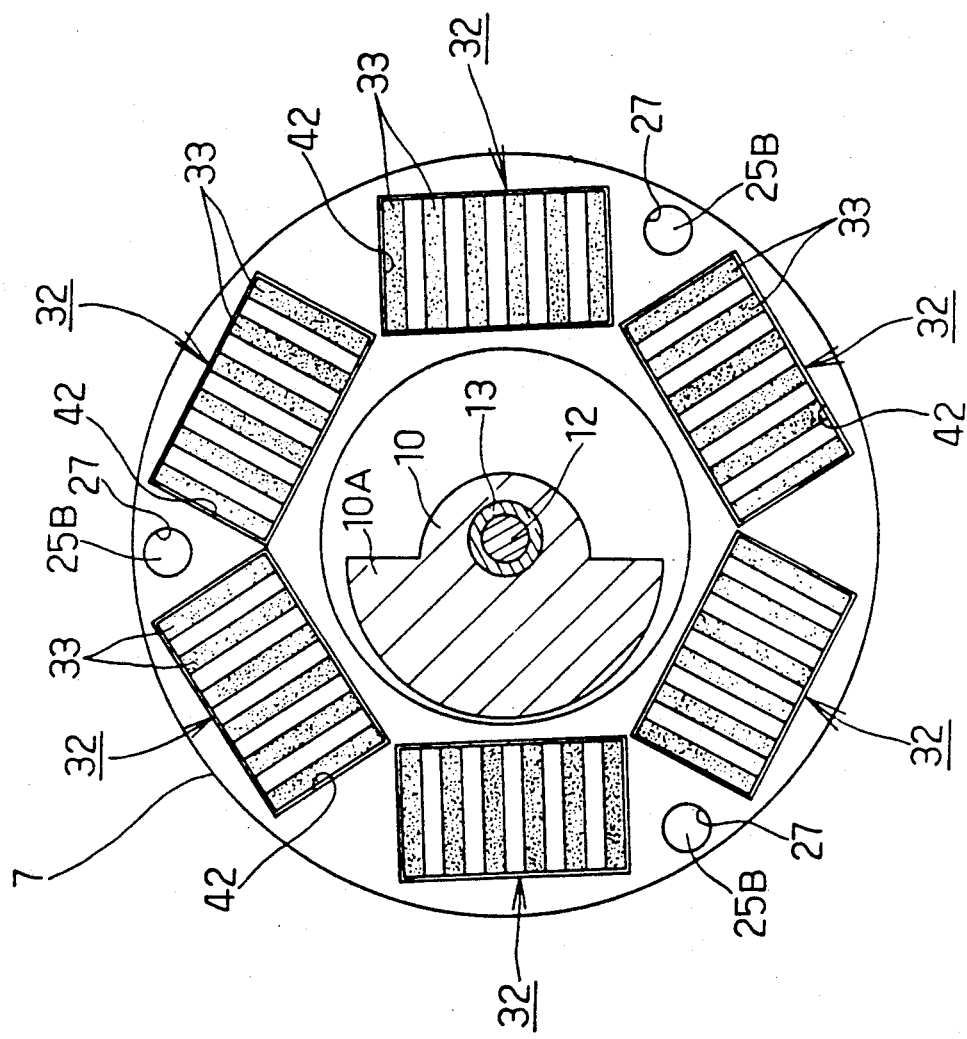

As will be apparent from FIGS. 2 and 3, these sets of the coils 31 and the magnets 32 are arranged at regular intervals and the magnetic poles of each set are arranged in a tangential direction. It should be understood that each pair of the diagonally opposed coils are driven at a same phase, namely, each pair of the diagonally opposed linear motors corresponds to one phase and respective phases form a star connection. Thus, a drive mode thereof is similar to that for the three-phase rotary electromotor.

Each coil 31 is received in a recess 41 formed in the upper side of the stationary member 3 while each magnet 32 is received in a recess 42 formed in lower side (rear side) of the movable scroll member 7 so that each pair of the mutually associated coil 31 and magnet 32 are opposed to each other.

In such scroll-type fluid handling machine 1, the movable side scroll member 7 may be directly driven to be rotated together with the magnets 32 by properly controlling three-phase AC supplied to the respective coils 31.

With this embodiment, the movable side scroll member is directly driven, instead of being eccentrically driven from the rotary electromotor via the crankshaft, so the mechanical loss can be minimized and thereby the mechanical efficiency can be improved. Further, the electromotor comprises the linear motors and the coils on the primary side face the magnets on the secondary side. Such feature makes the drive shaft as well as the crankshaft which have conventionally been essential to the machine unnecessary and allows the axial dimension of the machine itself to be substantially reduced. In this manner, it is possible to obtain a compact, light weight machine of fewer parts, to simplify the construction and thereby to reduce a manufacturing cost.

Now another embodiment will be discussed.

Figure 7:
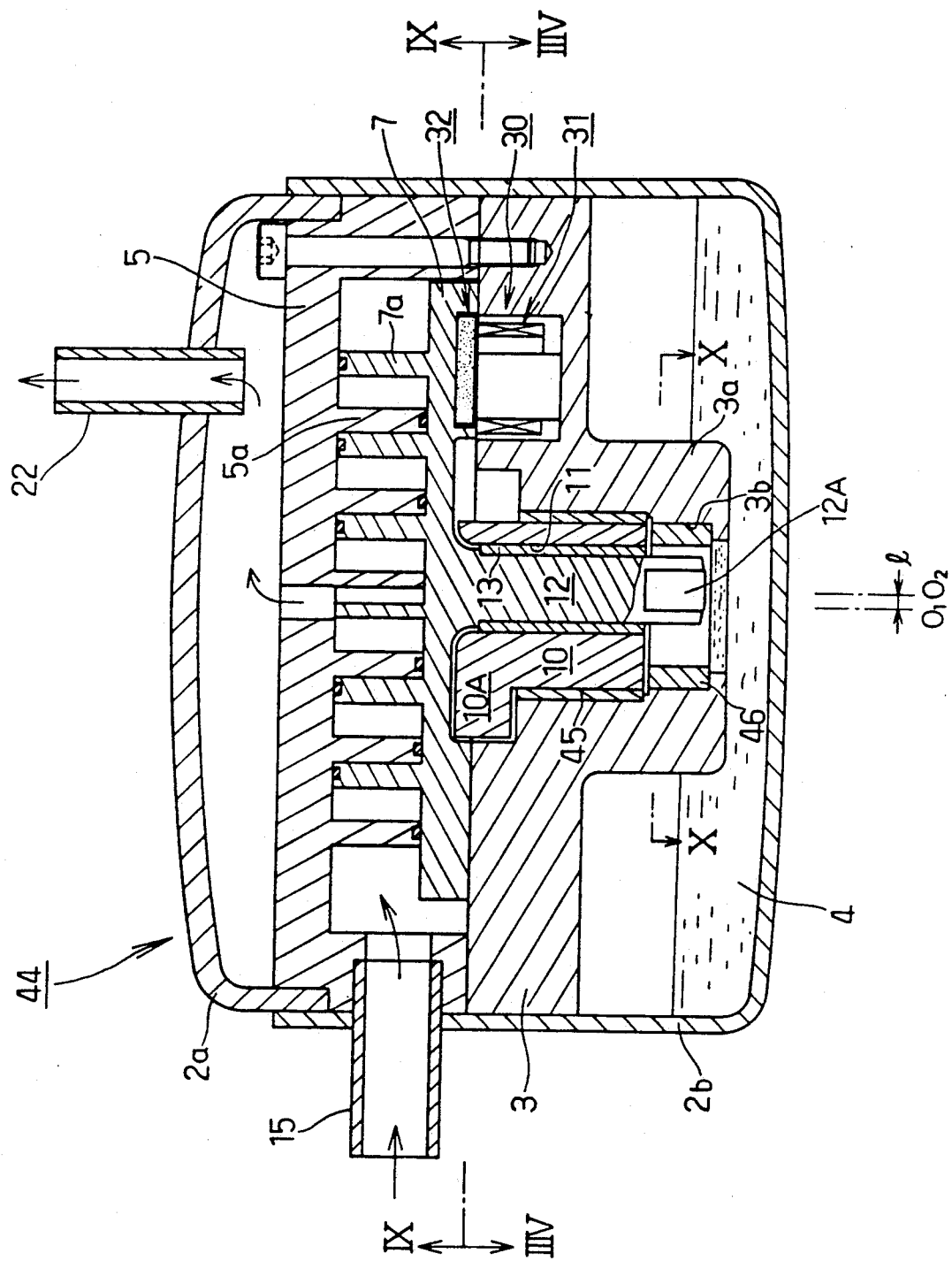
Figure 8:
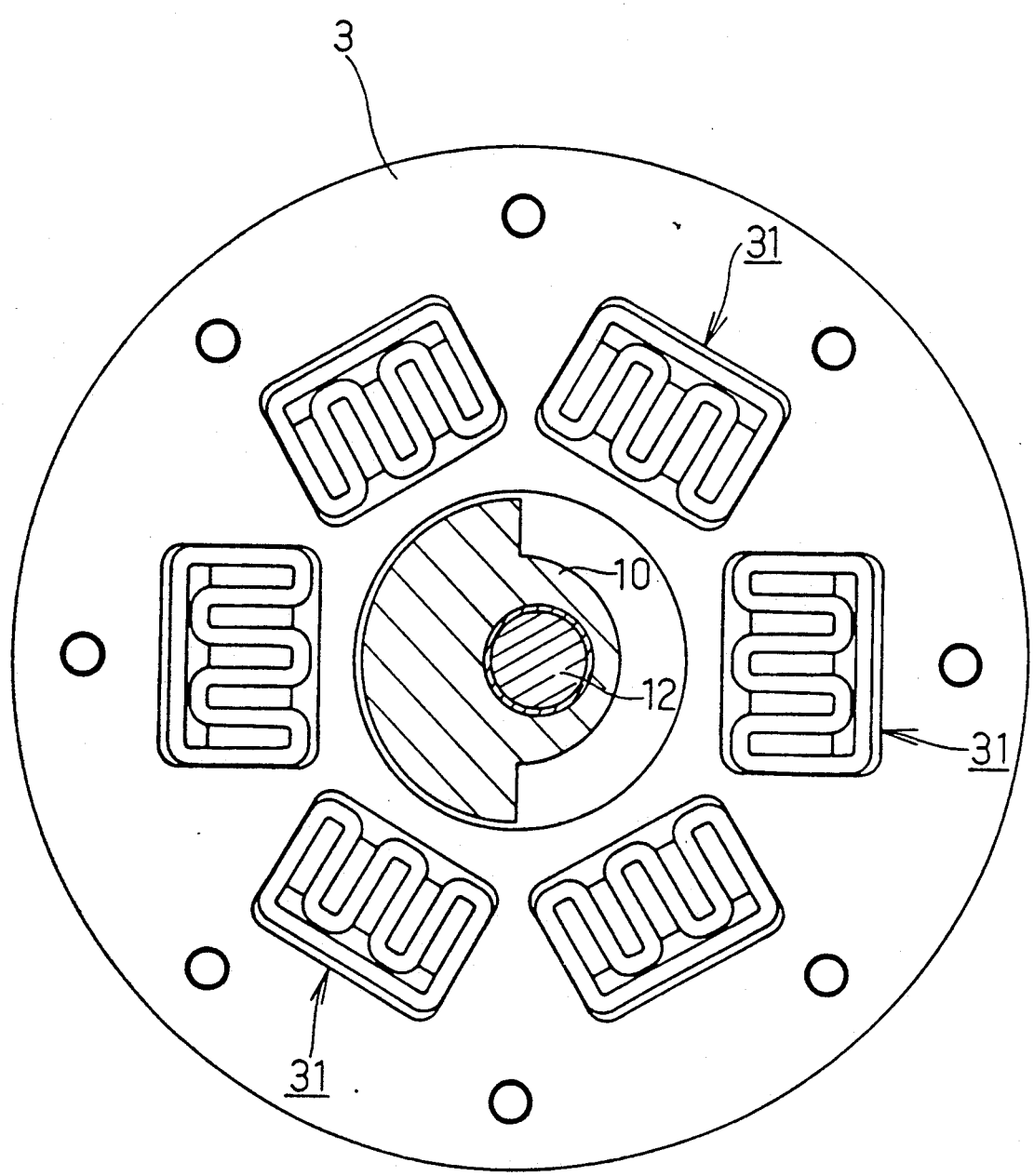
Figure 9:
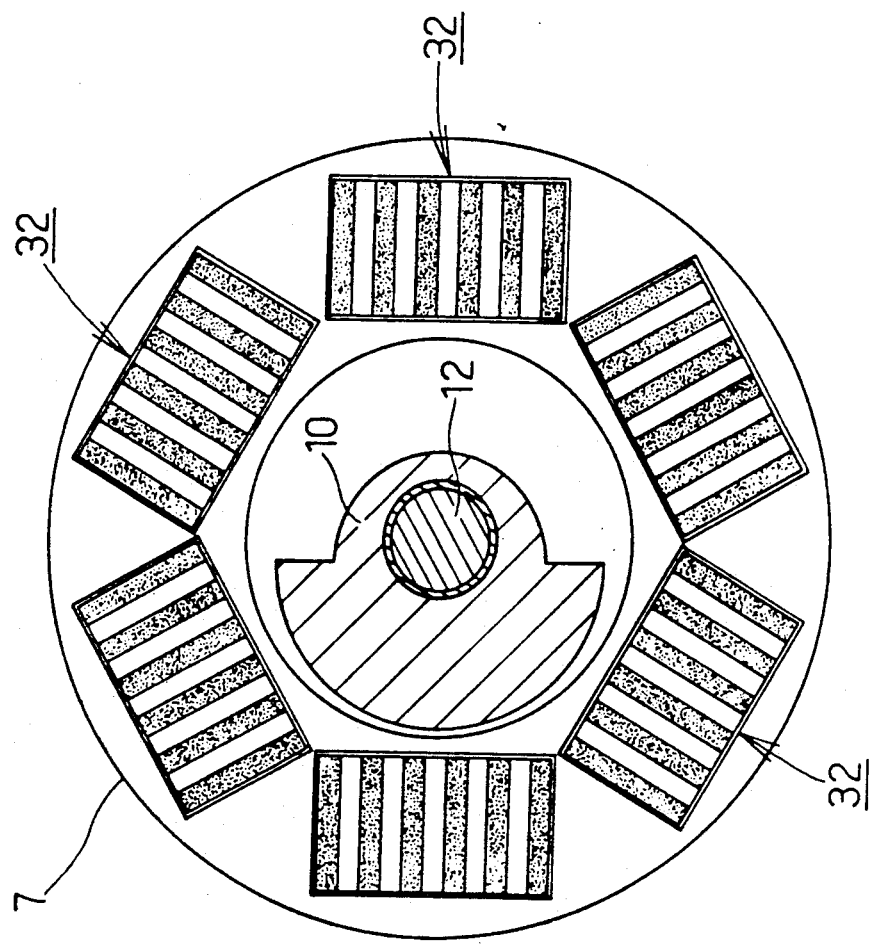

With the scroll-type fluid handling machine 44 according to this embodiment, as shown in FIGS. 7 through 9, the movable side magnets 32 of the respective linear motors are provided on the lower side of the movable side scroll member 7 while the stationary side coils 31 are provided on the stationary member 3, and the mechanism 24 to prevent the movable scroll member 7 from uncontrollably rotating is provided in the form of a Scotch yoke.

Figure 10:
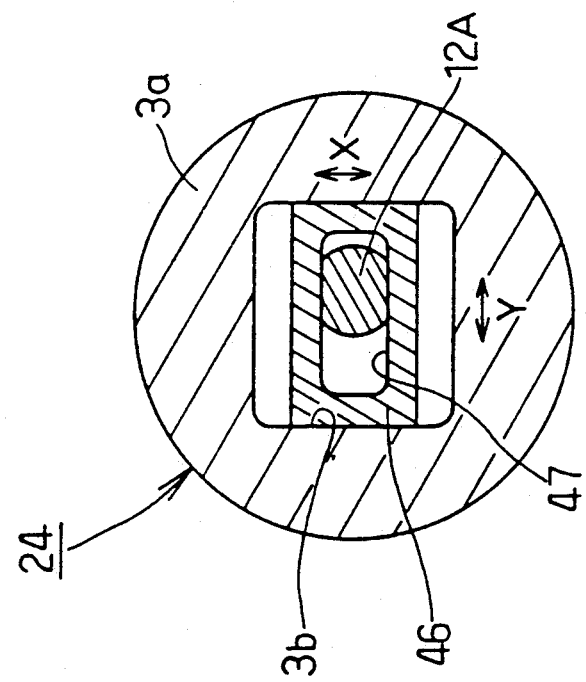

More specifically, the mechanism 24 is so arranged, as seen in FIG. 7, that the stationary member 3 is centrally provided with a boss 3a projecting downward and holding therein the stationary shaft 10 by means of a metallic bearing 45. An eccentric opening 11 formed through said stationary shaft 10 receives the rotatable shaft 12 extending therethrough by means of the metallic bearing 13. Said boss like portion 3a formed therein at its lower end with a first guide groove 3b, as seen in FIG. 10, adapted to loosely receive a movable member 46 which is, in turn, adapted to be slidably movable within said guide groove 3b in one direction (indicated by an arrow X) in a plane being parallel to said movable side scroll member 7.

The movable member 46 is formed with a second guide groove 47 extending transversely of said first guide groove 3b and an interlocking portion 12a formed on the lower end of said rotatable shaft 12 is loosely received in said guide groove 47 so that said interlocking portion 12A may be slidably movable in the guide groove 47 in a direction (indicated by an arrow Y) transversely of said first guide groove 3b.

Thus, as in the previous embodiment, it is possible to prevent the movable side scroll member which eccentrically moves from uncontrollably rotating and thereby to achieve the same effect as achieved by the previous embodiment.

Figure 11:
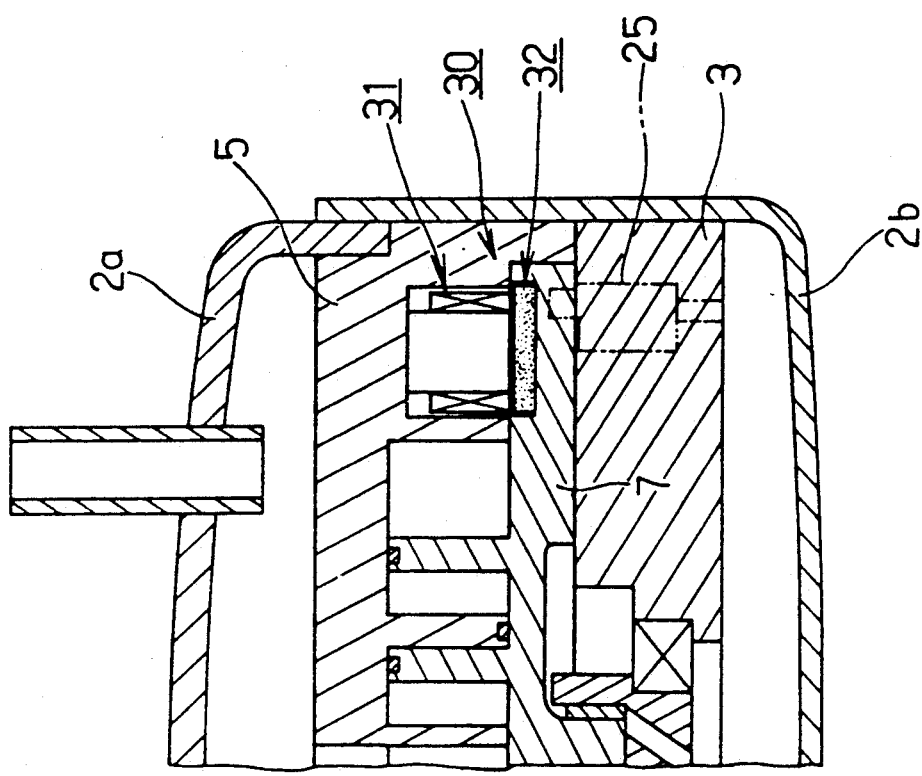
FIG. 11 is a fragmentary sectional view of the scroll-type fluid handling machine as a further another embodiment of the invention.

Though the movable side magnets 32 of the linear motors are provided on the lower (i.e., rear) side of the movable side scroll member 7 and the stationary side coils 31 are provided on the upper side of the stationary member 3 in the above-mentioned both embodiments, it is also possible to provide the movable side magnets 32 on the upper side of the movable side scroll member 7 while to provide the stationary side coils 31 on the lower side of the stationary side scroll member 5, as seen in FIG. 11, so as to achieve the same effect as achieved by the previously mentioned embodiments so far as said magnets and said coils are positioned so as to face one another in the axial direction of the machine itself. In the last-mentioned embodiment, the coils and the magnets attract one another in the axial direction to enhance a sealed condition of the compressing chambers defined between the both scrolls, to reduce a resistance occurring in the thrust direction and thereby to improve a durability.

Although the linear motor has been described as the three-phase linear motor, the number of phases is not critical and the number of the linear motor for each phase may comprise three or more sets.

What is claimed is:

1. A scroll-type fluid handling machine having a hermetically sealed casing enclosing therein a stationary side scroll member fixed to the casing, a movable side scroll member adapted to be rotatable in engagement with the stationary side scroll member and an electromotor used to drive the movable side scroll member, said scroll-type fluid handling machine being characterized by that said electromotor comprises a linear motor consisting of movable side magnets and stationary side coils; that said movable side magnets face the stationary side coils in the axial direction of the machine itself; and that said movable side magnets are mounted on said movable side scroll member and said stational side coils are fixed to the casing.

* * * * *